United States Patent

Firestone

[15] 3,660,797

[45] May 2, 1972

[54] TELEPHONE CONNECTOR

[72] Inventor: Jerome Firestone, Mt. Vernon, N.Y.

[73] Assignee: Saxton Products, Inc., Congers, N.Y.

[22] Filed: Nov. 9, 1970

[21] Appl. No.: 88,013

[52] U.S. Cl. ......................339/29 R, 339/210 M, 339/256 S

[51] Int. Cl. .......................................................H01r 13/12

[58] Field of Search ................................339/28, 29, 31–33, 339/153–159, 210, 211, 213, 256

[56] References Cited

UNITED STATES PATENTS

| | | | |
|---|---|---|---|
| 3,131,013 | 4/1964 | Carlson | 339/14 |
| 2,427,001 | 9/1947 | Hubbell et al. | 339/256 S |
| 2,245,068 | 6/1941 | Chirelstein | 339/159 C |
| 2,484,092 | 10/1949 | Hopgood | 339/159 C |

FOREIGN PATENTS OR APPLICATIONS

| | | | |
|---|---|---|---|
| 1,314,507 | 12/1962 | France | 339/256 S |

*Primary Examiner*—Joseph H. McGlynn
*Attorney*—Michael S. Striker

[57] ABSTRACT

A cupped housing has an open side releasably closed by a cover. Male contacts project from the exterior of the cover and each have a portion projecting beyond the interior of the cover into the open side of the cupped housing. Helical springs are pushed onto the interiorly projecting portions of the contacts and each have an open face end registering with apertures provided for this purpose in the cupped housing portion opposite the cover.

8 Claims, 3 Drawing Figures

INVENTOR
JEROME FIRESTONE
BY
ATTORNEY

TELEPHONE CONNECTOR

BACKGROUND OF THE INVENTION

The present invention relates primarily to connectors, and more particularly to telephone connectors.

When telephones are installed so that they can be moved from location to location, the conventional connector which non-releasably connects the telephone cord with the incoming telephone wires, usually in the baseboard region of a room, is replaced with a female socket and at the end of the telephone cord there is provided a male plug which can be releasably inserted into the female contacts of the socket. At all locations where it is desired to use the telephone similar female sockets are provided which in each instance are of course connected with the incoming telephone wires, and to move the telephone from location to location it is simply necessary to withdraw the male plug from one female socket and to insert it into a female socket at the location where it is desired to use the telephone.

Similarly, if it is intended to provide for a simple installation of several such sockets without having to make permanent connection with the incoming telephone wires, then one of the sockets may be permanently connected with the incoming telephone wires. To one free end of a piece of telephone wire which can reach from the socket to whatever location where the use of the telephone is desired, there is connected a male telephone plug which can mate with the jack. At the other free end of the telephone wire there is connected an additional female connector and at the free end of the wire connected to the telephone itself there is provided another male connector. When now the male connector on the extension wire is inserted into the socket which is permanently connected with the incoming telephone wires, and when the male connector on the end of the wire connected with the telephone is inserted into the female connector at the free end of the extension wire, then the telephone can be used at a desired distance from the original socket, that is it can be used at the desired second location.

Unfortunately, it is now no longer possible to connect an additional telephone with the original socket. In other words, with this type of arrangement only a single telephone can be used.

SUMMARY OF THE INVENTION

It is, accordingly, an object of the present invention to overcome the aforementioned disadvantages.

More particularly it is an object of the present invention to provide an improved telephone connector having both male and female contacts so that with the male contacts it can mate with female contacts of a female socket, whereas with its female contacts the male contacts of an additional telephone jack can be mated.

A concomitant object is to provide such an improved telephone connector which is simple in its construction and highly reliable in operation.

In pursuance of the above objects, and others which will become apparent hereafter, one feature of the invention recites, briefly stated, in a telephone connector which comprises a housing having two opposite exterior sides, a plurality of male contacts projecting from one of these sides and adapted to mate with female contacts on a telephone jack, and a plurality of female contacts accessible at the other of the sides and each conductively connected in the interior of the housing with one of the male contacts.

In this manner the male contacts of the novel telephone connector according to the present invention may be inserted into the female contacts of an existing telephone jack which in turn is connected with incoming telephone wires. An extension wire connected with the male and female contacts in the interior of the novel telephone connector may be provided at its remote end with another female telephone socket or jack so that a telephone can be connected thereto. Additionally, however, a male telephone connector on the free end of the wire connected with a second telephone may be inserted into the male contacts of the novel telephone connector, so that two telephones may now be operated off the single permanently installed telephone jack.

On the other hand, the novel telephone connector may also be secured to the free end of the wire which is connected with the telephone set. In that case its male contacts may then be inserted into the female contacts of an existing telephone jack, and the male contacts of a male connector secured to the wire of an additional telephone set may be inserted into the female contacts of the novel telephone connector. Thus, two telephones can be again operated off the single permanently installed telephone jack and may, for instance, be located at opposite sides of a double or of twin beds.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
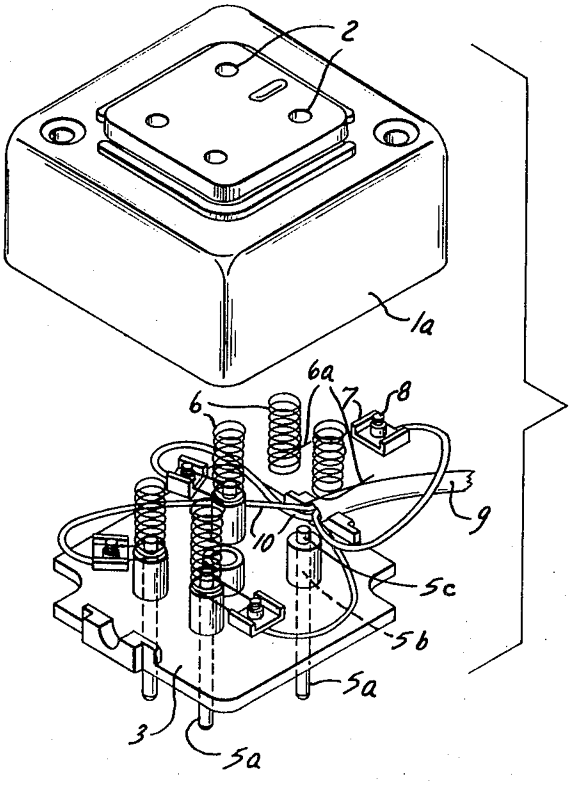
FIG. 1 is an exploded perspective view illustrating the novel telephone connector according to the present invention.

Discussing now the drawing in detail, and firstly FIG. 1, it will be seen that the novel telephone connector according to the present invention—which I prefer to call a "piggy back connector"—has a housing composed of a substantially cup-shaped portion 1*a* whose opening or open side is closed by a substantially plate-shaped portion 1*b*. At the side opposite its opening the cupped portion 1*a* is provided with the requisite number—namely four—of openings 2.

The inner side of the plate-shaped portion 1*b* is identified with reference numeral 3 and normally faces the interior of the cupped portion 1*a* when the two portions are connected in suitable manner, for instance by means of a screw passing through the portion 1*b* and meshing with threads provided at a suitable location in the portion 1*a*.

Projecting inwardly beyond the inner side 3 is a plurality of bosses or projections 4. A plurality of male contact pins are provided on the portion 1*b* and have sections 5*a* projecting therefrom so as to be located exteriorly of the housing 1*a*, 1*b* when the two portions 1*a*, 1*b* are connected. Inner sections 5*b* are embedded in the bosses 4 and inner contact portions 5*c*—usually of one piece with the sections 5*b* but also capable of being provided as discrete elements which are conductively connected with the inner sections 5*b*—project inwardly beyond the bosses 4. If indeed the sections 5*c* are simply portions of the contact pins, then the female contacts in form of coiled—usually helically springs 6 can be slipped with one open end directly over the sections 5*c* in frictional engagement therewith so as to establish an electrical contact between the female contacts 6 and the male contacts 5*a*, 5*b*, 5*c*.

In the region of that end which is adjacent the bosses 4 the coiled springs 6 carry clamps 7, simply metallic elements provided with a tapped bore into which a screw 8 is threaded so that between the head of the screw 8 and the element 7 a conductor 10 of an extension wire 9 can be clamped in conductive relationship, thereby establishing a conductive connection between this conductor 10 and the respective female contact 6 and its associated male contact 5*a*, 5*b*, 5*c*.

Preferably the housing portions 1*a* and 1*b*, as well as the bosses 4, are of synthetic plastic material, or at least predominantly of such material. In this case, the bosses 4 are advantageously of one piece with portion 1*b* and can be produced simultaneously with the production of the portion 1b in known manner. The length of the springs 6 is preferably so selected that when the portion 1b is connected with the portion 1a, the springs will be axially compressed to assure that they will be reliably retained in engagement with the respective sections 5c of the male contacts. The other or opposite free ends or open ends of the springs 6 extend into recesses provided for this purpose in the inner side of the housing portion 1a which recesses register and communicate with the apertures 2, so that in turn the open free ends of the springs 6 communicate with these apertures 2. The clamps 7 are carried on portions 6a of the springs 6 which latter are preferably made of copper but could be made of another conductive material.

Figure 2:
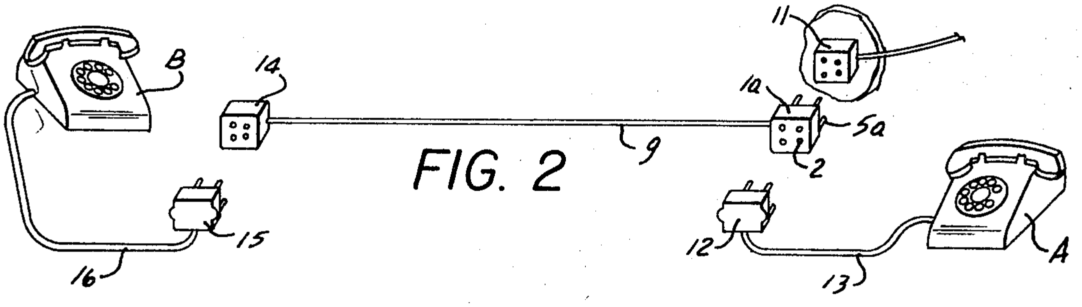
FIG. 2 is a diagrammatic view illustrating one possibility of use of the novel telephone connector.

As shown in FIG. 2, the novel telephone connector according to the present invention may be inserted with its male contact sections 5a into the openings of an existing wall jack 11 which is permanently connected with the incoming telephone wires in known manner. At the free end of the extension wire 9 connected with the novel connector according to the present invention, there is installed another jack 14 similar to the conventional jack 11. In this manner a telephone A can be connected with the existing jack 11 by providing on the free end of its telephone wire 13 a male connector 12 of conventional construction. The contacts of the male connector 12 are then inserted through the openings 2 of the novel telephone connector so as to make contact with the female contacts 6 thereof. These, in turn, are conductively associated with the male contacts 5c, 5b and 5a which in turn make contact with the female contacts of the existing wall jack. In addition, however, the use of the novel telephone connector makes it possible to connect a second telephone B with the existing wall jack 11. For this purpose it is simply necessary to again secure on the free end of the telephone wire 16 of the telephone set D a male connector 15 identical with the connector 12, and which is mated with the female contacts of the jack 14 which is secured to the free end of the extension wire 9.

Figure 3:
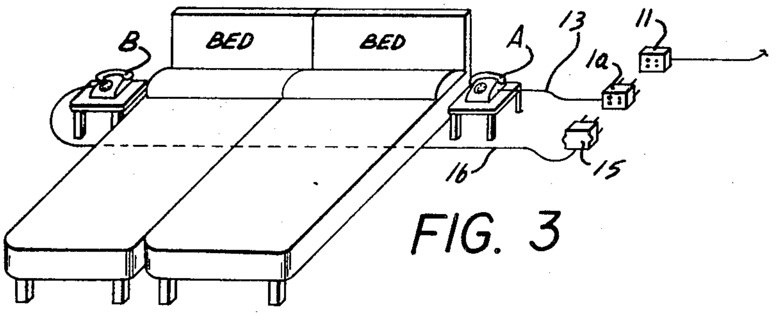
FIG. 3 is another diagrammatic view illustrating an additional possibility of use of the novel connector.

A further possibility of use is illustrated in FIG. 3 where like reference numerals identify like elements as in FIG. 2. Again, the existing permanently installed wall jack is identified with reference numeral 11. The novel telephone connector according to the present invention in this possibility of use is connected to the free end of the telephone wire 13 of the telephone set A. Thus, it is used in FIG. 3 in place of the male connector 12 shown in FIG. 2. The male contacts 5a of the novel connector are then again inserted into the female contacts of the existing wall jack 11. As in FIG. 2, the free end of the telephone wire 16 of the telephone set B has secured thereto a male connector 15 which is plugged into the female contacts of the novel telephone connector according to the present invention, so that the phones A and B may for instance be located at opposite sides of a double bed or twin beds as illustrated.

The versatility of the telephone connector according to the present invention will thus be obvious. It is further pointed out in this connection that the use of the female springs 6 which are compressed between the bosses 4 and the inner side of the housing portion 1a always assures a reliable contact of these springs with the respectively associated section 5c of the male contacts, so that the possibility of inadequate contact and therefore improper operation of the connected telephone is remote if not completely removed at least as far as this particular reason for malfunction is concerned.

Of course, it would also be possible to have the springs 6 only abut against the sections 5c rather than to surround them. Furthermore, it would be possible to replace the sections 5c which are integral with the sections 5b, with screws or other threaded elements engaging with tapped bores provided in the sections 5b for this purpose, and again to have the springs 6 either surround the heads of these screws or simply abut against these heads.

It will be understood that each of the elements described above, or two or more together, may also find a useful application in other types of constructions differing from the types described above.

While the invention has been illustrated and described as embodied in a telephone connector , it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended

1. A telephone connector, comprising a housing a cupped portion having two opposite sides one of which is open, and a cover portion releasably connected with said cupped portion closing said one side and having a surface facing inwardly thereof; a plurality of male contacts each having an outer section and an inner section with the latter projecting beyond said surface into said housing; abutment portions in part embedding said inner sections; and a plurality of female contacts accessible at the other of said opposite sides and comprising coil springs each having opposite open ends one of which is exposed at said other side and the other of which accommodates a part of a respective one of said inner sections in conductive relationship therewith and bearing against a respective abutment portion.

2. A telephone connector as defined in claim 1, wherein said housing consists at least predominantly of synthetic plastic material.

3. A telephone connector as defined in claim 1, wherein said cover portion is plate-shaped.

4. A telephone connector as defined in claim 1, said cupped portion having a plurality of openings in said other side, and said one open ends of said springs each registering with one of said openings.

5. A telephone connector as defined in claim 1, said abutment portions being bosses projecting from said surface and each in part embedding one of said inner sections.

6. A telephone connector as defined in claim 1; and further comprising conductive clamps provided on said springs in the region of said other ends thereof and operative for conductively clamping a signal conductor.

7. A telephone connector as defined in claim 1, wherein said coil springs are helical springs.

8. A telephone connector as defined in claim 7, wherein said springs have a axial length so selected that they are axially compressed within said cupped portion intermediate said other side and said cover portion.

* * * * *